United States Patent
Vakrat

(10) Patent No.: US 7,889,942 B2
(45) Date of Patent: Feb. 15, 2011

(54) DYNAMIC RANGE COMPENSATION-DEPENDENT NOISE REDUCTION

(75) Inventor: Dudi Vakrat, Nethanya (IL)

(73) Assignee: Zoran Corporation, Sunnyvale, CA (US)

( * ) Notice: Subject to any disclaimer, the term of this patent is extended or adjusted under 35 U.S.C. 154(b) by 935 days.

(21) Appl. No.: 11/754,170

(22) Filed: May 25, 2007

(65) Prior Publication Data
US 2008/0292202 A1 Nov. 27, 2008

(51) Int. Cl.
*G06K 9/40* (2006.01)

(52) U.S. Cl. .................. 382/261; 382/254; 382/260; 382/275

(58) Field of Classification Search ............... None
See application file for complete search history.

(56) References Cited

U.S. PATENT DOCUMENTS

| | | | |
|---|---|---|---|
| 5,012,333 A * | 4/1991 | Lee et al. .................. 358/520 |
| 5,442,462 A * | 8/1995 | Guissin ..................... 358/463 |
| 5,461,655 A | 10/1995 | Vuylsteke et al. |
| 5,923,775 A * | 7/1999 | Snyder et al. ............... 382/172 |
| 5,978,518 A * | 11/1999 | Oliyide et al. .............. 382/260 |
| 6,580,835 B1 | 6/2003 | Gallagher et al. |
| 6,625,325 B2 | 9/2003 | Gindele et al. |
| 6,681,054 B1 * | 1/2004 | Gindele ..................... 382/272 |
| 6,718,068 B1 | 4/2004 | Gindele et al. |
| 6,738,494 B1 | 5/2004 | Savakis et al. |
| 6,757,442 B1 * | 6/2004 | Avinash ..................... 382/274 |
| 6,804,393 B2 | 10/2004 | Gindele et al. |
| 6,807,300 B1 | 10/2004 | Gindele et al. |
| 6,813,389 B1 | 11/2004 | Gindele et al. |
| 6,856,704 B1 | 2/2005 | Gallagher et al. |
| 6,931,160 B2 | 8/2005 | Gindele et al. |
| 6,937,772 B2 | 8/2005 | Gindele |
| 6,937,775 B2 * | 8/2005 | Gindele et al. ............... 382/254 |
| 6,973,218 B2 * | 12/2005 | Alderson et al. ............. 382/260 |
| 7,054,501 B1 | 5/2006 | Gindele et al. |
| 7,065,255 B2 | 6/2006 | Chen et al. |
| 7,092,579 B2 | 8/2006 | Serrano et al. |
| 7,116,838 B2 | 10/2006 | Gindele et al. |
| 7,324,701 B2 * | 1/2008 | Nakami ...................... 382/262 |
| 2002/0028025 A1 * | 3/2002 | Hong ......................... 382/260 |
| 2005/0089239 A1 * | 4/2005 | Brajovic ..................... 382/266 |
| 2005/0129330 A1 * | 6/2005 | Shyshkin .................... 382/275 |
| 2008/0292209 A1 | 11/2008 | Vakrat |

OTHER PUBLICATIONS

Lee, "Digital Image Smoothing and the Sigma Filter," *Computer Visiion, Graphics, and Image Processing*, vol. 24, pp. 255-269 (1983).
Co-pending U.S. Appl. No. 12/121,183 filed May 15, 2008.
Non-Final Office Action Mailed Sep. 21, 2010 in Co-Pending U.S. Appl. No. 12/121,183 filed May 15, 2008.

* cited by examiner

*Primary Examiner*—Samir A Ahmed
*Assistant Examiner*—Li Liu
(74) *Attorney, Agent, or Firm*—Perkins Coie LLP

(57) ABSTRACT

Methods and corresponding apparatus are presented that perform dynamic range compensation (DRC) and noise reduction (NR) together on a pixel-by-pixel basis, adjusting the noise reduction parameters in response to the dynamic range compensation decisions. By such a modification of image noise reduction parameters based on the dynamic range compensation gain or, more generally, other such factors, these techniques make it possible to perform DRC on noisy images, achieving an image with low and uniform noise levels.

30 Claims, 3 Drawing Sheets

DYNAMIC RANGE COMPENSATION-DEPENDENT NOISE REDUCTION

BACKGROUND

This application relates to image processing in digital cameras and other electronic digital image acquisition devices, and particularly to techniques of improving noise reduction techniques for such images.

FIG. 1 is a block diagram of some elements of a typical imaging system, such as a digital still or video camera. The image is captured at block 101, which schematically represents the various front-end elements (lens, sensor array, analog to digital conversion, etc.) that precede the Image Processing Unit (IPU) 111 and supply the image to the IPU. The image data can be supplied to the IPU as raw image, RGB, YCbCg422, YCbCr444, or other format where it can be received in a SDRAM 113, for example. The IPU will generally contain a number of additional elements, implemented in hardware, software, or some combination of these, as is familiar in the art, but which are suppressed here for simplification of the discussion. In this embodiment, the block labeled DRC (Dynamic Range Compensation) 117 in the middle of the processing chain receives a 3-color ×12 bit linear RGB image constructed by, in this embodiment, the Color Interpolation (CI) unit 115 if needed. (Although the 3-color ×12 bit linear RGB format is described here, other formats for the image data can also be used.) The RGB output image of the DRC block, here again taken as being a 3 color ×12 bit linear RGB image, is then processed by the rest of the Image Processing Unit (IPU) pipeline and, typically, eventually JPEG encoded.

Prior to the image data being received at the DRC block 117, it frequently undergoes a noise reduction process. The block labeled NR (Noise Reduction) 119 is interposed between the DRC element 117 and, here, the color interpolation unit 115. The NR block 119 receives the input pixel data Pin, subjects it to a noise reduction process, and outputs the result Pnr, which in turn is the input to DRC 117, whose pixel data output is labeled Pout. These algorithms are well known in the art and are well documented. When applying local Dynamic Range Compensation (DRC) on noisy images, that is, brightening dark areas of a noisy image, or enhancing contrast in bright areas of a noisy image, there is a side effect of varying noise levels in the image. This is due to the fact that DRC enhances noise as well as details. In effect, areas that went through DRC can appear much noisier than areas that did not go through DRC. Of course, if the NR unit 119 were to remove the noise completely, this would solve the problem; however, this would also remove much of the image detail and, in order to preserve texture and granularity in the image, it is common practice to reduce the amount of noise in the image, but not to remove it completely.

FIG. 2 is a block diagram of a noise reduction implementation. Pixels of an image, Pin(x,y), are stored in a memory buffer 213 and are accessed, using memory control 211 that supplies the read/write control signals and addressing, by a noise reduction unit 119 to perform the noise reduction algorithm. For simplicity, only two scales are used in this example, the current pixel and the region of its surrounding 8 pixels. The block 201 calculates the blending factor, $\alpha$, based on the current pixel, Pin(x,y), and its surrounding neighbors. This is done by assessing the amount of detail in the region, setting the value $\alpha$ higher where detail is detected, and lower where uniformity is detected. This allows for noise reduction without too much loss of detail. The block 203 then averages the neighboring pixels:

$$Pavg(x,y)=(\Sigma^1_{-1}\Sigma^1_{-1}Pin(x,y))/9$$

where x and y are the column and row indices of the image and the sum in this embodiment is over the 3-by-3 pixel neighborhood centered oh the pixel at (x,y). Finally the current pixel is multiplied (at 205) by the blend factor $(1-\alpha)$ and added (at 209) to the average of its neighbors multiplied (at 207) by $\alpha$. This procedure is repeated for each pixel in the image, thereby reducing the noise of the image.

Subsequently, the dynamic range of the image is enhanced as shown in the DRC block 117 in FIG. 3. The system computes a gain (or attenuation), G(x,y), for each sensor pixel at location (x,y). Each color component (Pnr) of the input RGB image ($R_{in}$, $G_{in}$, $B_{in}$) is multiplied by G(x,y) to produce the output color component for that pixel Pout(x,y):

$$Pout(x,y)=G(x,y)*Pnr,$$

where C=R, G or B and in the above equation, and following discussion, '*' stands for multiplication.

As shown in FIG. 3, the color components of the input RGB image is received at block 301 where the grey intensity image, I(x,y), is determined as the maximum value of the three color components of the input image pixel ($R_{in}$, $G_{in}$, $B_{in}$):

$$I(x,y)=\max(R_{in}(x,y),G_{in}(x,y),B_{in}(x,y)).$$

Other methods, such as those that use the luminance (Y), as in YcbCr or YUV, or other combination (e.g., Y=0.3R+0.6G+0.1B) could also be used.

In block 303, the log of I(x,y) is formed by means of a look-up table or by other computational means:

$$L(x,y)=\text{Log}(I(x,y)).$$

L(x,y) then serves as the measure of the image strength or amplitude that is input into block 305 where low pass filtering and non-linear combining are performed to produce an image, B(x,y), where details of this process in the basic embodiment are given with respect to FIG. 3. The image B(x,y) is applied to a gain look-up table, 307, to determine the gain values, G(x,y).

These various prior art methods tend to have a number of shortcomings when it comes to implementation in digital cameras, video, and other imaging systems. As described, previous implementations of digital cameras often reduce noise in an image by means of multi-scale algorithms, which blend each pixel with averages of the surrounding pixels at various scales, the degree of blending dependent on the current pixel and an assessment of the presence of detail in the region. Subsequently, the dynamic range of the image may be enhanced by increasing the gain of the image in areas of shadow, or reducing the gain of the image in regions of brightness. However, the concatenation of these two processes suffers from more apparent graininess and speckle in the regions compensated due to the fact that the dynamic range compensation enhances noise as well as details. Further, given that the development of sensors with higher pixel densities will tend to make pixels noisier, techniques to treat these problems will likely grow in importance.

SUMMARY

Methods and corresponding apparatus are presented for a processing of image data that includes both dynamic range compensation and noise reduction. A dynamic range compensation process and a noise reduction process are performed concurrently and on a pixel-by-pixel basis. According to one aspect, the noise reduction factor used on a given pixel from the image data is responsive to a gain factor for the given pixel determined by the dynamic range compensation process. According to another aspect, the noise variance of the combined noise reduced and range compensated image data is independent of the amount of dynamic range compensation.

In an exemplary embodiment, a noise reduction module receives the values of a given pixel and the pixels in the neighborhood of this pixel. It also receives a gain or other factor determined for the given pixel by, for example, a dynamic range compensation process. From the values of the pixels of the neighborhood, an average image strength for the neighborhood is formed. The output signal is then formed from a combination of the value of the given pixel and the average image strength of its neighborhood, where the combination is responsive to the gain factor of the given pixel.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION OF EXEMPLARY EMBODIMENTS

Overview

The methods and corresponding apparatus presented below use techniques that perform dynamic range compensation (DRC) and noise reduction (NR) together on a pixel-by-pixel basis, adjusting the noise reduction parameters in response to the dynamic range compensation decisions. By such a modification of image noise reduction parameters based on the dynamic range compensation gain, these techniques make it possible to perform DRC on noisy images, achieving an image with low and, importantly, uniform noise levels. This allows camera manufacturers, for example, to apply DRC to high-ISO images (images containing high noise levels due high gain amplification between the sensor output and the input to the digital camera's A/D converter) and still meet desired image quality standards.

These techniques are fundamentally different from that which is usually found in the prior art in that the dynamic range enhancement and noise reduction are performed simultaneously and interactively. Furthermore, the presented technology uses the uniformity or "flatness" of the given region being processed to reduce or disable noise reduction so that detail and texture are not lost in the noise reduction process.

Although the following description describes a process that continuously modifies the noise reduction amount based on the pixel-by-pixel gain to be applied in the dynamic range correction process, the process may be more widely employed for gain or other factors from other processes. An image processing unit may also perform other corrections on a set of image data that introduce gain factors such as, light balance or color mapping, for example. These processes may similarly amplify the noise of the image. The present techniques can similarly be applied in these cases by performing these other operations concurrently to provide a corresponding compensation factor on a pixel-by-pixel basis. Additionally, although the discussion is presented in the context of a process performed on a pixel-by-pixel basis, more generally it can be performed on sets of pixels, such as on block-by-block basis for N-by-N blocks, where N is some integer that could be larger than one, in addition to the exemplary N=1 embodiment. For all of the embodiments presented here, it will be appreciated that the various modules may be implemented in hardware, software, firmware, or a combination of these, and that image data may originate from digital video, camera, or other imaging systems. Additionally, the process is not limited to the RGB format.

Dynamic Range Compensation and Noise Reduction in Conjunction

Figure 4:
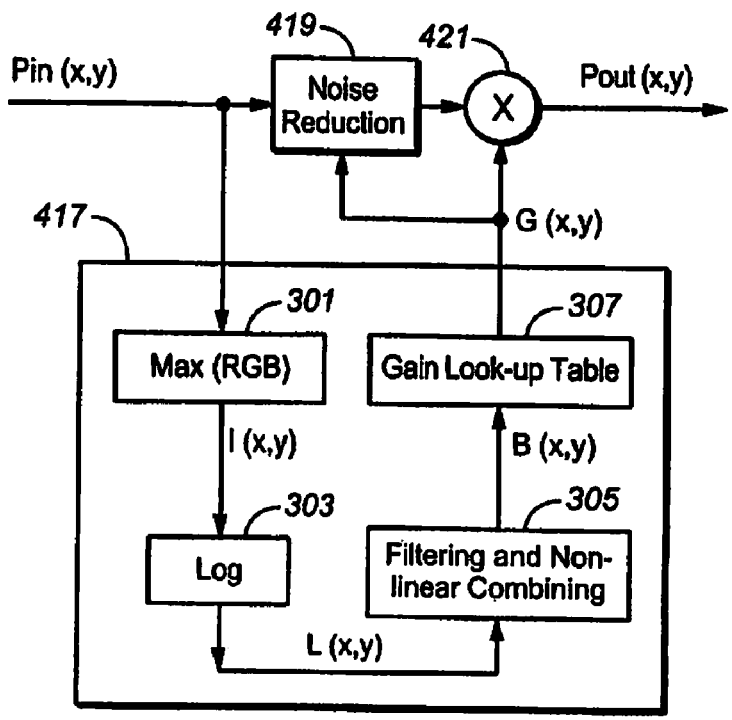
FIG. 4 is a block diagram of an image processing section where dynamic range compensation and noise reduction are performed simultaneously and interactively.

FIG. 4 is a block diagram of an exemplary embodiment showing the interaction between the Dynamic Range Compensation and the Noise Reduction processes. Note that instead of being performed serially, as is standard in prior art solutions, the two functions are performed simultaneously, in parallel, with the effective gain of the DRC process, G(x,y), informing the Noise Reduction process. This allows the noise reduction process to modify its "blend factor", α, such that the noise variance is uniform across the whole image, yielding a superior image quality.

Figure 3:
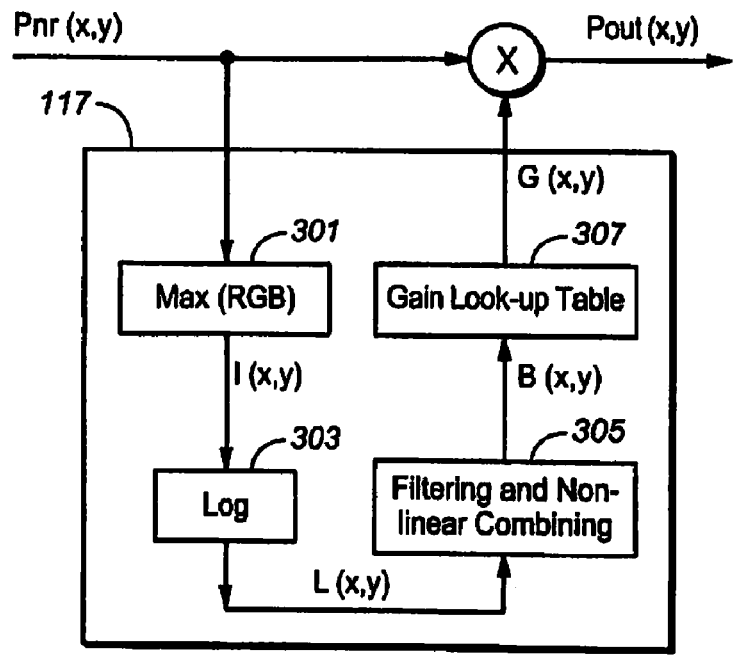
FIG. 3 is a block diagram of a basic dynamic range compensation embodiment.

In FIG. 4, the dynamic range compensation elements (301, 303, 305, 307) are as in FIG. 3, but the input signal received at block 301 is now Pin(x,y), the signal prior to undergoing a noise reduction process. In FIG. 4, the same input signal Pin(x,y) is now concurrently provided to both the DRC elements and the noise reduction section 419. It should be noted that other embodiments than shown in FIG. 4 may be used for dynamic range compensation. Consequently, although FIG. 4 shows one preferred embodiment of DRC, the invention is not so limited. More specifically, one particular preferred DRC embodiment is presented in U.S. patent application Ser. No. 11/752,797, which provides more detail on elements 301, 303, 307, and, particularly, 305. Whatever the embodiment used for the DRC elements, it will receive the same input as the noise reduction section 419 and supply its output, the effective gain G(x,y), for use in the noise reduction section 419 as well as apply the effective gain to the output of the noise reduction section at 421.

Figure 1:
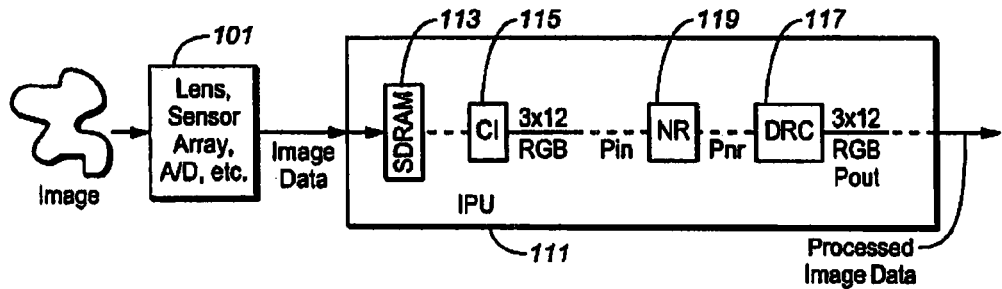
FIG. 1 illustrates a Image Processing Unit (IPU) of a camera or other image acquisition device in a typical prior art arrangement.
Figure 2:
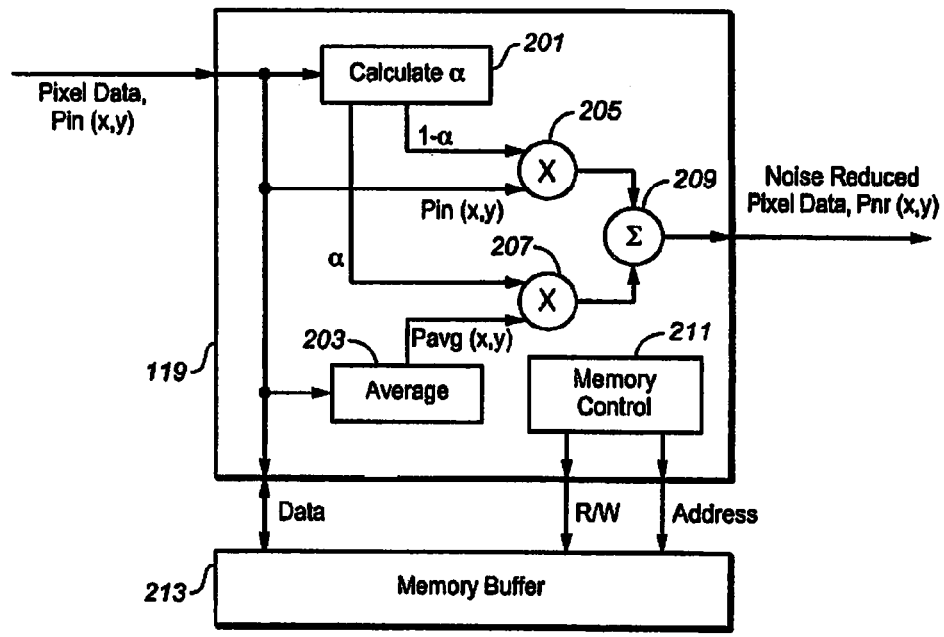
FIG. 2 is a block diagram of a basic noise reduction circuit embodiment.
Figure 5:
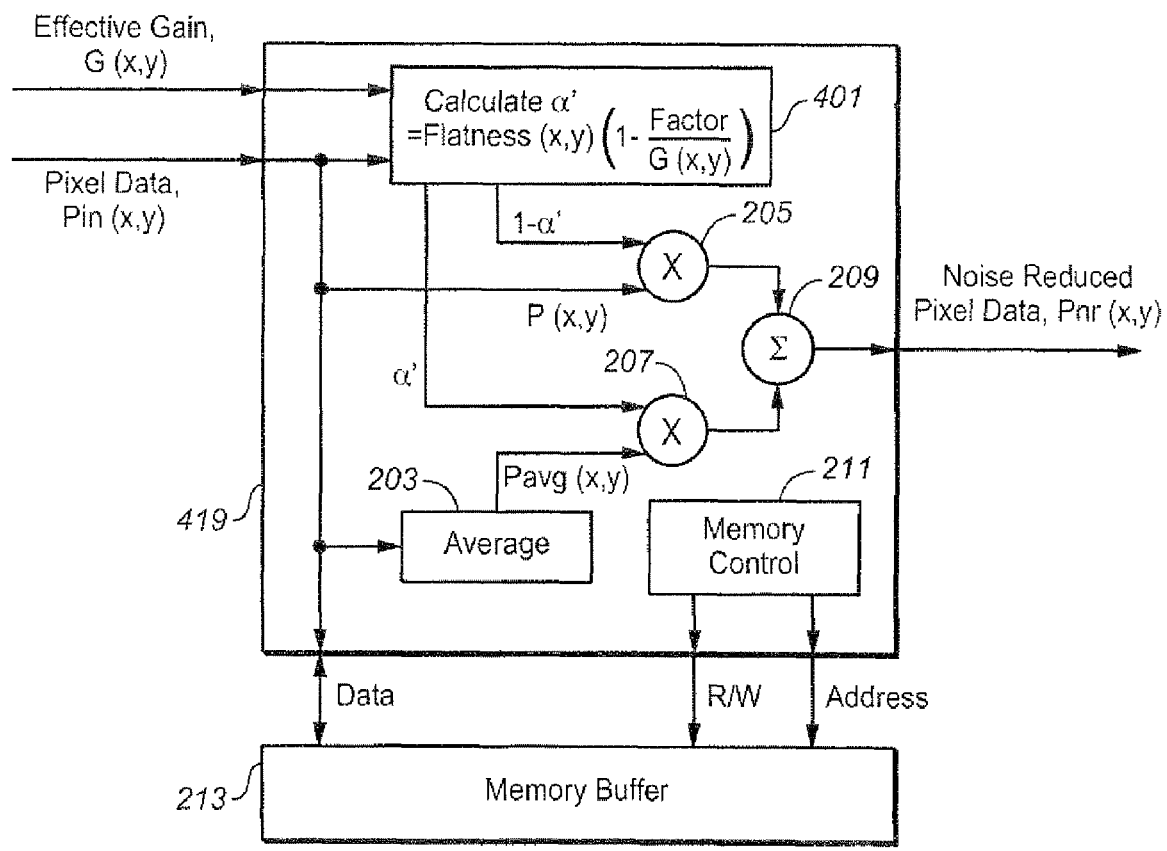
FIG. 5 shows a block diagram of one embodiment of a noise reduction circuit employing the effective gain.

A number of implementations are possible for the Noise Reduction block 419, with one advantageous embodiment being that presented in a U.S. patent application Ser. No. 11/754,202, entitled "Advanced Noise Reduction in Digital Cameras" by Dudi Vakra, Noam Korem, and Victor Pinto filed May 25, 2007. FIG. 5 shows the internal workings of a particular embodiment of the Noise Reduction block 419 that can be used for illustrating aspects of the present invention. As with the prior art arrangement described above with respect to FIG. 2, in the example of FIG. 5 the noise reduced pixel data at a given pixel is also a linear combination of Pin and a value averaged over adjoining pixels, but the coefficients with which these are combined is now dependent upon the result of the dynamic range compensation process.

More specifically, the effective gain, $G(x,y)$, or other such factor is utilized in the calculation of the blending factor, $\alpha'$, in element 401. The other elements of FIG. 5 are here taken to be the same as in FIG. 2. In this exemplary embodiment, the blending factor is chosen such that $\alpha'$=flatness(x,y){1−Factor/G(x,y)}, where Factor is the desired noise reduction parameter. If the noise variance of the current pixel, $\sigma_{x,y}$, is gaussian and white (as is typical), then the noise variance of the average of the neighboring pixels will be theoretically zero, or in practice at least very small. Therefore the noise variance of the pixels emerging from the Noise Reduction process, the Pnr(x,y) values, will be a function of ($\sigma_{x,y}$*Factor/G(x,y)), and after applying the Dynamic Range Compensation, the noise variance emerging from the system will be a function of ($\sigma_{x,y}$*Factor/G(x,y))*G(x,y)=($\sigma_{x,y}$*Factor). Note that in this embodiment the result is independent of $G(x,y)$ and thus will be uniform across the image regardless of the effective gain applied in regions of the image. (Or, more precisely, even when the noise reduction and dynamic range compensation have non-trivial results this will be the case, since if these processes do not alter the image data, the result is independent of $G(x,y)$ by default.) Thus, the graininess and speckle resulting in prior art solutions can be effectively eliminated.

In order to understand how the blending factor, a', is calculated, and how the noise reduction filter operates as a whole, refer to the pseudo-code example below. In this example, the manufacturer can determine the constants "A" and "T" as a calibration step. The constant "Factor" can be determined by the manufacturer, or may be user controllable.

"T" is a threshold that indicates the noise levels of the camera's sensor and changes according to the ISO sensitivity for differing exposure (shutter speed and lens aperture size combination) settings. For a given camera and a given ISO setting, the camera manufacturer can, for example, calculate T by capturing a color chart and then determining the maximum value of abs(Pin[x,y]−Pin[x+n,y+m]) over all the uniform (or "flat") areas in the image (areas without edges or transitions).

A" is a threshold that is used to detect whether or not the current region of the image is flat and uniform, or whether it contains edges and details that should be preserved. It can arbitrarily selected to be approximately, say, 0.75. If the variable "flatness(x,y)" in the example below is above this threshold, the current region is deemed to be sufficiently uniform and flat to allow noise reduction to occur; otherwise, noise reduction is disabled in order to preserve detail.

The parameter "Factor" is in the range of [0,1] and determines the uniform noise level, relative to the uniform noise level on the original image before Nit and DRC, that will remain on the output image after Noise Reduction and Dynamic Range Compensation. If Factor=0 then the noise will be removed almost completely; however textures and fine details which are below the noise level (indicated by threshold 'T') will be eliminated as well. On the other hand, if Factor=1, then all textures and details will be preserved, however the noise will not be reduced at all. In other words, Factor controls the trade-off between preserving fine details and removing noise.

Noise Reduction Filter Example

This section presents an exemplary implementation of the noise reduction filter 419. The exemplary filter operates on an environment of N×N pixels around the current pixel, where N is an odd number. As noted above, this illustrative example is just one of many possible embodiments by which the effective gain from the dynamic range compensation section can be incorporated into the noise reduction process. More detail on filtering methods that can be incorporated within the present invention are presented in the U.S. patent application Ser. No. 11/754,202, entitled "Advanced Noise Reduction in Digital Cameras" by Dudi Vakra, Noam Korem, and Victor Pinto filed May 25, 2007. As noted above, the gain or other factor could be from another module (such as light balance, color mapping, chromaticity, shading, spatial frequency, gradient, chromaticity variations, or some combination of these) that concurrently produces a compensation factor on a pixel-by-pixel basis as well as, or in addition to, that from a dynamic range compensation module. As also noted above, although the pixel-by-pixel implementation is discussed in detail, a block-by-block or other multi-pixel implementations can also be used.

According to this particular embodiment, for each input image pixel in (x,y) coordinates, Pin[x,y], perform

```
{
    Sum[x,y] = 0
    Count[x,y] = 0
    for (m=−(N−1)/2; m<=(N−1)/2;m++)
    {
        for (n=−(N−1)/2; n<=(N−1)/2;n++)
        {
            Sum[x,y] = Sum[x,y] +Pin[x+n,y+m]
            if(abs(Pin[x,y]−Pin[x+n,y+m])<T)
            {
                Count[x,y]=Count[x,y]+1
            }
        }
    }
    Average[x,y] = Sum[x,y]/(N²)
    Flatness [x,y] = Count[x,y]/(N²)
    If (Flatness[x,y]<A)
        Flatness[x,y]=0
    Else
        Flatness[x,y]=(Flatness[x,y]−A)/(1−A)
    Alpha[x,y] = Flatness[x,y]*(1 − Factor/Gain[x,y])
    Pnr[x,y] = Alpha[x,y]*Average[x,y] + (1−Alpha[x,y])*Pin[x,y]
}
```

In the pseudo-code of this example, the variable Sum[x,y] is the total of the values of all the pixels in the calculation neighborhood. Thus when it is divided by $N^2$, it is the average of all the pixels in the region. The variable Count[x,y] is the total number of occurrences in the region when the difference between the current pixel and one of its neighbors is below the threshold of noise, T. When divided by $N^2$, it becomes a variable between 0 and 1, called Flatness[x,y], that indicates the relative uniformity or flatness of the region. If this variable is below the threshold A, no noise reduction is performed in order to preserve detail. If Flatness[x,y] is above the threshold A, it is used to calculate the blending variable α', Alpha[x,y], such that the more uniform the region, the more blending that is allowed. Finally the noise reduced pixel data is calculated by blending the current pixel with the average of its neighbors using Alpha[x,y], as indicated. Although the exemplary embodiment forms a linear combination of the Pin and the average strength for the neighborhood, other gain dependent functions or combinations may also be employed.

In regions containing edges and fine detail, Flatness [x,y] will tend to 0 and therefore the exemplary filter actually performs little or nothing:

Pnr[x,y]=Pin[x,y]

This means that the filter will avoid averaging the current pixel with the neighboring pixels, thereby preserving the edges and detail.

In areas of great uniformity, Flatness [x,y] will tend to 1 and therefore the filter actually performs:

Pnr[x,y]=(1−Factor/Gain[x,y])*Average[x,y]+Factor/Gain[x,y]*Pin[x,y]

This means that the filter will perform a weighted average of the current pixel with the neighboring pixels in order to remove noise. The higher the gain, the higher the weight of the average relative to the weight of the current pixel, and noise filtering becomes more aggressive.

Assuming that N is big enough so that the noise variance on Average[x,y] is very close to 0, and assuming the noise variance of the noise on Pin[x,y] is σ, then the noise variance of Pnr[x,y], $\sigma_{nr}$, will be:

$\sigma_{nr}$=Factor/Gain[x,y]*σ

The noise variance of the noise on Pout[x,y], $\sigma_{Pout}$, will be:

$\sigma_{Pout}$=Gain[x,y]*Factor/Gain[x,y]*σ=Factor*σ

This means that the noise levels on the output image will be uniform, and controllable by changing the parameter Factor.

The camera manufacturer can choose a different Factor per camera and per ISO setting, according to the desired performance level. Alternatively, the camera manufacturer can let the user control Factor (through a control on the camera, for example) so that the user will be able to control the aggressiveness of noise reduction per camera mode or even per image. The following is one example of a calibration procedure that the camera manufacturer or the user can use to find the appropriate value of Factor to match the desired performance level:

(a) Set Factor to starting value of, say, ½.
(b) Given a camera, and given an ISO setting, capture an image that includes flat areas (a color chart for example) as well as other objects containing textures and fine details.
(c) Process the image in the camera with NR and/or DRC turned on.
(d) If the image is too noisy then decrease "factor" a bit; if the image lacks texture and details, increase "factor" a bit.
(e) Repeat sections (b), (c), and (d) until the procedure converges to an image that is most desirable.

CONCLUSION

Consequently, as described, the techniques described here continuously modify the noise reduction amount based on the pixel-by-pixel gain to be applied in the dynamic range correction process, using a technology in which dynamic range enhancement and noise reduction are performed simultaneously and interactively. Furthermore, it uses the uniformity (or "flatness") of the given region being processed to reduce or disable noise reduction so that detail and texture are not lost in the noise reduction process.

Although the various aspects of the present invention have been described with respect to exemplary embodiments thereof, it will be understood that the present invention is entitled to protection within the full scope of the appended claims.

It is claimed:

1. A method of processing image data, comprising:
performing a dynamic range compensation process on the image data for a set of one or more pixels; and
concurrently with the dynamic range compensation process, performing a noise reduction operation on the image data for the set of pixels, wherein a noise reduction factor used by the noise reduction operation on the pixels of the set of pixels is responsive to a gain factor for the set of pixels determined by the dynamic range compensation process.

2. The method of claim 1, wherein the dynamic range compensation process and the noise reduction operation are performed on pixel by pixel bases, the noise reduction factor being used on a given pixel being responsive to the gain factor for the given pixel.

3. The method of claim 1, wherein said set of one or more pixels is an N by N block of pixels, where N is an integer greater than one, the dynamic range compensation process and the noise reduction operation being performed on blocks of N by N pixels at a time.

4. The method of claim 1, wherein the noise reduction operation on the set of pixels provides an output value formed from a combination of the received value of the set of pixels and a measure of the value of pixels in the neighborhood of the set of pixels, the combination being responsive to the gain factor.

5. The method of claim 4, wherein the combination is responsive to the uniformity of the neighborhood of the set of pixels.

6. The method of claim 4, wherein the combination is a linear combination of the received value of the set of pixels and the measure of the value of pixels in the neighborhood of set of pixels.

7. A method of processing image data, comprising:
performing a dynamic range compensation process with a non-trivial result on the image data for a set of one or more pixels; and
concurrently with the dynamic range compensation process, performing a noise reduction operation with a non-trivial result on the image data for the set of one or more pixels, wherein a noise variance of the combined noise reduced and dynamic range compensated image data is independent of the amount of dynamic range compensation.

8. The method of claim 7, wherein the dynamic range compensation process and the noise reduction operation are performed on pixel by pixel bases.

9. The method of claim 7, wherein said set of one or more pixels is an N by N block of pixels, where N is an integer greater than one, the dynamic range compensation process and the noise reduction operation being performed on blocks of N by N pixels at a time.

10. The method of claim 7, wherein the noise reduction operation on the set of pixels provides an output value formed from a combination of the received value of the set of pixels and a measure of the value of pixels in the neighborhood of the set of pixels, the combination being responsive to the gain factor.

11. The method of claim 10, wherein the combination is responsive to the uniformity of the neighborhood of the set of pixels.

12. The method of claim 10, wherein the combination is a linear combination of the received value of the set of pixels and the measure of the value of pixels in the neighborhood of set of pixels.

13. A method of processing image data, comprising:
receiving, in a noise reduction process, a measure of the image strength at a first pixel set of the image data;
receiving, in the noise reduction process, a measure of the image strength of a plurality of pixels of the image data in a neighborhood of the first pixel set;
receiving, in the noise reduction process, from a dynamic range compensation process, a factor specifically determined for the first pixel set;
forming, in the noise reduction process, an average image strength level for the neighborhood of the first pixel set from the strength levels of the first pixel set and the plurality of pixels in the neighborhood of the first pixel set; and
forming an output signal for the first pixel set, the output signal being a combination of the image strength at the first pixel set and the average image strength level for the neighborhood of the first pixel set, wherein the combination is responsive to said factor.

14. The method of claim 13, wherein the first pixel set is a single pixel.

15. The method of claim 13, wherein the first pixel set is an N by N block of pixels.

16. The method of claim 13, further comprising:
performing a dynamic range compensation process for said first pixel set, including determining said factor, said factor being a gain factor.

17. The method of claim 13, wherein the combination is responsive to the uniformity of the set image data in the neighborhood of the first pixel set.

18. The method of claim 13, wherein the combination is a linear combination of the image strength at the first pixel set and the average image strength level for the neighborhood of the first pixel set.

19. An image processing unit, comprising:
a dynamic range compensation module connectable to receive image data and perform a dynamic range compensation process thereon for a set of one or more pixels; and
a noise reduction circuit to receive the image data and connectable to the dynamic range compensation module to receive a gain factor determined by the dynamic range compensation process for the set of pixels, wherein the noise reduction circuit performs a noise reduction operation on the image data for the set of pixels concurrently with the dynamic range compensation process, the noise reduction circuit uses a noise reduction factor on the pixels of the set of pixels, and the noise reduction factor is responsive to the gain factor.

20. The image processing unit of claim 19, wherein the dynamic range compensation process and the noise reduction operation are performed on pixel by pixel bases, the noise reduction factor being used on a given pixel being responsive to the gain factor for the given pixel.

21. The image processing unit of claim 19, wherein said set of one or more pixels is an N by N block of pixels, where N is an integer greater than one, the dynamic range compensation process and the noise reduction operation being performed on blocks of N by N pixels at a time.

22. The image processing unit of claim 19, wherein the noise reduction operation on the set of pixels provides an output value formed from a combination of the received value of the set of pixels and a measure of the value of pixels in the neighborhood of the set of pixels, the combination being responsive to the gain factor.

23. The image processing unit of claim 22, wherein the combination is responsive to the uniformity of the neighborhood of the set of pixels.

24. The image processing unit of claim 22, wherein the combination is a linear combination of the received value of the set of pixels and the measure of the value of pixels in the neighborhood of set of pixels.

25. An image processing unit, comprising:
a noise reduction circuit having as inputs a measure of the image strength at a first pixel set of image data, a measure of the image strength of a plurality of pixels of the image data in a neighborhood of the first pixel set, and a factor specifically determined for the first pixel set, the noise reduction circuit having:
an averaging section which determines an average image strength level for the neighborhood of the first pixel set from the strength levels of the first pixel set and the plurality of pixels in the neighborhood of the first pixel set;
a coefficient determination section which provides a coefficient derived from the factor; and
a blending section to provide an output signal which is a combination of the image strength at the first pixel set and the average image strength level for the neighborhood of the first pixel set, wherein the combination is responsive to said coefficient.

26. The image processing unit of claim 25, wherein the first pixel set is a single pixel.

27. The image processing unit of claim 25, wherein the first pixel set is an N by N block of pixels.

28. The image processing unit of claim 25, further including:
a dynamic range compensation module connected to receive said measure of the image strength at the first pixel set and determine therefrom said factor, said factor being a gain factor.

29. The image processing unit of claim 25, wherein said coefficient is responsive to the uniformity of the set image data in the neighborhood of the first pixel.

30. The image processing unit of claim 25, wherein the combination is a linear combination of the image strength at the first pixel set and the average image strength level for the neighborhood of the first pixel set.

\* \* \* \* \*

UNITED STATES PATENT AND TRADEMARK OFFICE
CERTIFICATE OF CORRECTION

PATENT NO. : 7,889,942 B2  Page 1 of 1
APPLICATION NO. : 11/754170
DATED : February 15, 2011
INVENTOR(S) : Dudi Vakrat It is certified that error appears in the above-identified patent and that said Letters Patent is hereby corrected as shown below:

In column 4, line 66: delete "Vakra" and insert --Vakrat-- in place thereof.

Signed and Sealed this
Fifth Day of April, 2011

David J. Kappos
*Director of the United States Patent and Trademark Office*